United States Patent
Bastidas et al.

(10) Patent No.: US 8,088,207 B2
(45) Date of Patent: Jan. 3, 2012

(54) ELEVEN-COLOR PRINTING INK SET AND METHOD OF USE

(75) Inventors: Lenin W. Bastidas, Tinley Park, IL (US); James B. Hirst, Elgin, IL (US)

(73) Assignee: Clear Lam Packaging, Inc., Elk Grove Village, IL (US)

( * ) Notice: Subject to any disclaimer, the term of this patent is extended or adjusted under 35 U.S.C. 154(b) by 0 days.

(21) Appl. No.: 12/870,374

(22) Filed: Aug. 27, 2010

(65) Prior Publication Data

US 2011/0048264 A1    Mar. 3, 2011

Related U.S. Application Data

(60) Provisional application No. 61/238,055, filed on Aug. 28, 2009.

(51) Int. Cl.
*C09D 11/02* (2006.01)

(52) U.S. Cl. .................................. 106/31.6; 106/31.27

(58) Field of Classification Search .................. 106/31.6, 106/31.27
See application file for complete search history.

(56) References Cited

U.S. PATENT DOCUMENTS

| | | | |
|---|---|---|---|
| 1,703,449 A | 2/1929 | Huebner | |
| 3,434,227 A | 3/1969 | Brown, Jr. | |
| 4,003,311 A | 1/1977 | Bardin | |
| 5,734,800 A | 3/1998 | Herbert et al. | |
| 5,751,326 A | 5/1998 | Bernasconi | |
| 6,383,275 B1 | 5/2002 | Lin | |
| 6,834,934 B2 | 12/2004 | Kushner et al. | |
| 7,164,498 B2 | 1/2007 | Van Bael | |
| 7,288,141 B2* | 10/2007 | Sugimoto et al. | 106/31.27 |
| 7,494,538 B2 | 2/2009 | Koganehira et al. | |
| 2004/0030001 A1 | 2/2004 | Ma et al. | |
| 2004/0094065 A1* | 5/2004 | Reem et al. | 106/31.14 |
| 2005/0018024 A1 | 1/2005 | Sommer et al. | |
| 2006/0268084 A1* | 11/2006 | Nishizaki et al. | 347/100 |
| 2007/0008560 A1 | 1/2007 | Eschbach | |
| 2008/0024575 A1 | 1/2008 | Yue et al. | |
| 2008/0032098 A1* | 2/2008 | Hornby et al. | 428/195.1 |
| 2008/0158281 A1 | 7/2008 | Saito | |
| 2008/0182083 A1* | 7/2008 | Oyanagi et al. | 428/195.1 |

FOREIGN PATENT DOCUMENTS

EP    1559755 A1    8/2004

OTHER PUBLICATIONS

It was all about the Blues [online], [retrieved on Aug. 25, 2010]. Retrieved from the Internet <URL:http://www.rpdms.com/newblues/index.html>.

* cited by examiner

*Primary Examiner* — Jerry Lorengo
*Assistant Examiner* — Veronica F Faison

(57) ABSTRACT

An eleven-color printing ink set and method of use including an eleven-color ink set including a cyan ink with coordinates of $L^*=55$, $a^*=-28$, and $b^*=-43$; a magenta ink with coordinates of $L^*=48$, $a^*=61$, and $b^*=1$; a yellow ink with coordinates of $L^*=88$, $a^*=-5$, and $b^*=91$; a black ink with coordinates of $L^*=27$, $a^*=0.3$, $b^*=0.7$; an XG Purple 1 ink with coordinates of $L^*=41$, $a^*=10$, and $b^*=-53$; an XG Purple 2 ink with coordinates of $L^*=33$, $a^*=34$, and $b^*=-48$; an XG Orange 1 ink with coordinates of $L^*=67$, $a^*=53$, and $b^*=57$; an XG Orange 2 ink with coordinates of $L^*=56$, $a^*=61$, and $b^*=35$; an XG Green 1 ink with coordinates of $L^*=64$, $a^*=-57$, and $b^*=37$; an XG Green 2 ink with coordinates of $L^*=63$, $a^*=-65$, and $b^*=6$; and an XG Quinacridone ink with coordinates of $L^*=62$, $a^*=49$, and $b^*=-19$.

17 Claims, 3 Drawing Sheets

ELEVEN-COLOR PRINTING INK SET AND METHOD OF USE

CLAIM FOR PRIORITY

This application claims priority from U.S. Provisional Application Ser. No. 61/238,055 filed Aug. 28, 2009, the complete subject matter of which is incorporated herein by reference in its entirety.

TECHNICAL FIELD

The field of this disclosure is printing inks and methods for printing with such inks, particularly, an eleven-color printing ink set and method of use.

BACKGROUND

Process printing is used with different kinds of printing operations. In general, the process color set has a limited number of colors, such as black, cyan, magenta, and yellow. Full color prints are made by color separating the original image into tone values of the process colors. The color separations can be printed sequentially and/or overlapped to produce the full-color print of the original image.

Unfortunately, a four-color ink set often cannot reproduce the full gamut of colors of the original image. One approach has been to use one or more spot colors, i.e., custom inks of a particular color, to print colors not achievable with the four-color ink set in an additional printing step. While this can produce truer colors, the spot colors complicate the printing, increasing cost. The spot colors must be selected to match the desired color, custom ink prepared, and printing steps added to print the additional colors. In addition, the printing equipment must be thoroughly cleaned so the spot colors do not contaminate future print jobs. The custom ink is only usable for the particular job, so left-over ink is often wasted. Some attempt may be made to reblend the left-over ink into another formula, but the reblended formula is no longer pure and may be susceptible to metamerism.

Another approach has been to increase the number of ink colors in the process color set. Unfortunately, even a color ink set with an increased number of ink colors often cannot produce the range of colors desired: the number of inks may not be adequate or may not be the right mix of colors to produce the desired colors. Often, the range of hue of a reduced gamut will not be able to produce the final color desired.

Another problem with process printing is obtaining colors from the production run which match the selected sample colors. Typically, sample colors are printed with an ink jet printer or other printing device and colors are then selected from the sample colors. The inks and production presses are set up to match the selected sample colors for the production run. Unfortunately, the colors in the final image may not match the selected sample colors: the sample colors may not match the actual results due to differences of printing on the production presses, as well as differences of the printing characteristics of the underlying substrates. Samples can be printed with the production presses and the ink and printing process adjusted to tune the production colors to the selected sample colors, but this increases the time and expense of printing and often requires pre-press approval by the customer.

It would be desirable to have an eleven-color printing ink set and method of use that would overcome the above disadvantages.

SUMMARY OF THE INVENTION

One aspect of the present invention provides an eleven-color ink set including a cyan ink with CIELAB coordinates of $L^*=55$, $a^*=-28$, and $b^*=-43$; a magenta ink with CIELAB coordinates of $L^*=48$, $a^*=61$, and $b^*=1$; a yellow ink with CIELAB coordinates of $L^*=88$, $a^*=-5$, and $b^*=91$; a black ink with CIELAB coordinates of $L^*=27$, $a^*=0.3$, $b^*=0.7$; an XG Purple 1 ink with CIELAB coordinates of $L^*=41$, $a^*=10$, and $b^*=-53$; an XG Purple 2 ink with coordinates of $L^*=33$, $a^*=34$, and $b^*=-48$; an XG Orange 1 ink with coordinates of $L^*=67$, $a^*=53$, and $b^*=57$; an XG Orange 2 ink with coordinates of $L^*=56$, $a^*=61$, and $b^*=35$; an XG Green 1 ink with coordinates of $L^*=64$, $a^*=-57$, and $b^*=37$; an XG Green 2 ink with coordinates of $L^*=63$, $a=-65$, and $b^*=6$; and an XG Quinacridone ink with coordinates of $L^*=62$, $a^*=49$, and $b^*=-19$. The CMC color tolerance for each ink is an L tolerance of $\pm 1.75$, a C tolerance of $\pm 1.50$, a cf tolerance of $\pm 1.5$, and a DECMC of $\pm 1.50$.

Another aspect of the present invention provides a method of printing an image including providing an eleven-color ink set; providing a color separation based on the eleven-color ink set; and printing the image solely with the eleven-color ink set according to the color separation. The eleven-color ink set includes a cyan ink with CIELAB coordinates of $L^*=55$, $a^*=-28$, and $b=-43$; a magenta ink with CIELAB coordinates of $L^*=48$, $a^*=61$, and $b^*=1$; a yellow ink with CIELAB coordinates of $L^*=88$, $a^*=-5$, and $b^*=91$; a black ink with CIELAB coordinates of $L^*=27$, $a^*=0.3$, $b^*=0.7$; an XG Purple 1 ink with CIELAB coordinates of $L^*=41$, $a^*=10$, and $b^*=-53$; an XG Purple 2 ink with coordinates of $L^*=33$, $a^*=34$, and $b=-48$; an XG Orange 1 ink with coordinates of $L^*=67$, $a^*=53$, and $b^*=57$; an XG Orange 2 ink with coordinates of $L^*=56$, $a^*=61$, and $b^*=35$; an XG Green 1 ink with coordinates of $L^*=64$, $a=-57$, and $b^*=37$; an XG Green 2 ink with coordinates of $L^*=63$, $a^*=-65$, and $b^*=6$; and an XG Quinacridone ink with coordinates of $L^*=62$, $a^*=49$, and $b^*=-19$. The CMC color tolerance for each ink is an L tolerance of $\pm 1.75$, a C tolerance of $\pm 1.50$, a cf tolerance of $\pm 1.5$, and a DECMC of $\pm 1.50$.

Yet another aspect of the present invention provides a method of printing an image with a production press including providing a production ink set; printing a sample book for the production ink set with the production press, the sample book including color samples indexed by substrate type, ink combination, and ink density; providing a target image having at least one target image color on a target substrate; selecting one of the color samples to match the at least one target image color, wherein the substrate type for the selected one of the color samples being the same as the target substrate; printing the image with the ink combination and ink density of the selected one of the color samples on a production substrate with the production press using the production ink set, the production substrate being the same as the substrate type for the selected one of the color samples.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION

Figure 1:
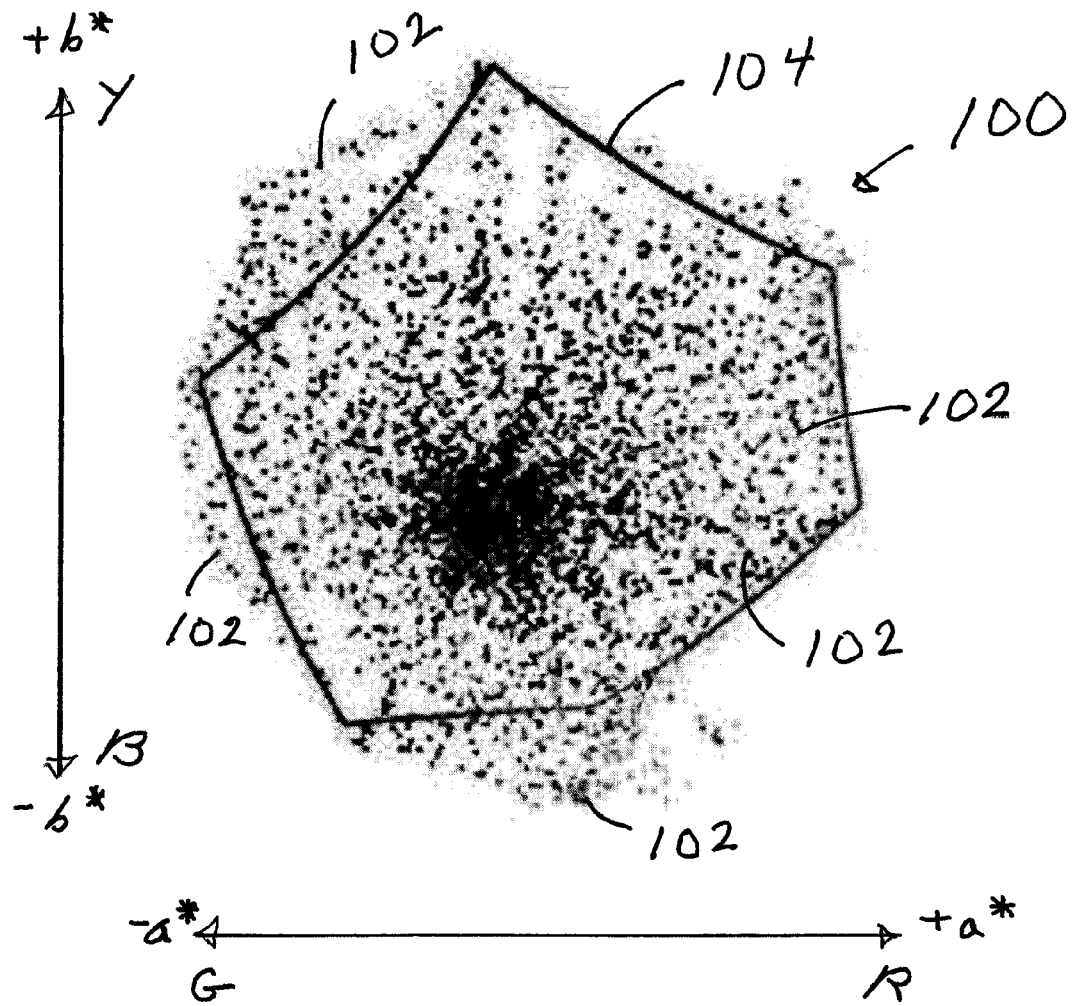
FIG. 1 is an exemplary multicolor profile chart for a four-color ink set gamut and nine of eleven-color ink set gamut for an eleven-color ink set of the present invention.

An eleven-color ink set extends the color gamut for process printing. In one embodiment, the eleven-color ink set includes a cyan (C) ink, a magenta (M) ink, a yellow (Y) ink, a black (K) ink, an XG Purple 1 (XGP1) ink, an XG Purple 2 (XGP2) ink, an XG Orange 1 (XGO1) ink, an XG Orange 2 (XGO2) ink, an XG Green 1 (XGG1) ink, an XG Green 2 (XGG2) ink, and an XG Quinacridone (XGQ) ink. The cyan, magenta, yellow, and black inks provides a four-color CYMK ink set and the XGP1, XGP2, XGO1, XGO2, XGG1, XGG2, and XGQ XG inks extend the color gamut of the four-color CYMK ink set.

The inks can be further described by the CIELAB coordinates $L^*$, $a^*$, and $b^*$, where $L^*$ is the color lightness, $a^*$ is the relative red/magenta vs. green position, and $b^*$ is the relative yellow vs. blue position. The CIELAB coordinate $L^*$ has a range of 0 for black to 100 for diffuse white, and the range for the CIELAB coordinates $a^*$ and $b^*$ depends on the color space. The cyan ink has CIELAB coordinates of $L^*=55$, $a^*=-28$, and $b^*=-43$; the magenta ink has CIELAB coordinates of $L^*=48$, $a^*=61$, and $b^*=1$; the yellow ink has CIELAB coordinates of $L^*=88$, $a^*=-5$, and $b^*=91$; the XGP1 ink has CIELAB coordinates of $L^*=38$, $a^*=11$, and $b^*=-55$; the XGP2 ink has CIELAB coordinates of $L^*=33$, $a^*=34$, and $b^*=-48$; the XGO1 ink has CIELAB coordinates of $L^*=67$, $a^*=53$, and $b^*=57$; the XGO2 ink has CIELAB coordinates of $L^*=56$, $a^*=61$, and $b^*=35$; the XGG1 ink has CIELAB coordinates of $L^*=64$, $a^*=-57$, and $b^*=37$; the XGG2 ink has CIELAB coordinates of $L^*=63$, $a^*=-65$, and $b^*=6$; and the XGQ ink has CIELAB coordinates of $L^*=62$, $a^*=49$, and $b^*=-19$. The black ink has a CIELAB coordinate of $L^*=27$, $a^*=0.3$, $b^*=0.7$. Those skilled in the art will appreciate that there can be some variation in the ink colors without perceptibly changing the overall printing results. The color tolerance can be selected to be looser or tighter as desired for a particular application. In one embodiment, the CMC color tolerance for each ink is an L tolerance of ±1.75, a C tolerance of ±1.50, a et tolerance of ±1.5, and a DECMC of ±1.50.

The CIELAB coordinates are based on the CIE $L^*a^*b^*$ (CIELAB) color space specified by the International Commission on Illumination (Commission Internationale d'Eclairage or CIE) for use in measurement of small color differences. The CIELAB color space describes all the colors visible to the human eye using the CIELAB coordinates $L^*$, $a^*$, and $b^*$. The CMC color tolerance is a color tolerancing system based on the CIELAB color space. The CMC color tolerance is based on the CIELAB color space. The CMC calculation mathematically defines an ellipsoid around a standard color in the color space. This ellipsoid consists of a semi-axis that corresponds to the attributes of hue, chroma, and lightness and represents the area of acceptance in relation to the standard. The size of the ellipsoid varies depending on position in the color space; for example, in the orange region, ellipsoids are narrower, while in the green region, ellipsoids are wider. Also, ellipsoids in high-chroma regions are larger than those in low-chroma regions.

The inks can be more narrowly described in another embodiment by the CIE LCH coordinates of L, C, and H, where L is the color lightness, C is chroma, and H is hue. The CIE LCH coordinate L has a range of 0 for black to 100 for diffuse white; the CIE LCH coordinate C has a range of 0 for unsaturated to 100 for saturated; and the CIE LCH coordinate H has a range of 0 to 359 degrees, from 0 degrees (red) through 90 degrees (yellow), 180 degrees (green), and 270 degrees (blue). The cyan ink has CIE LCH coordinates of L=55, C=51, and H=237; the magenta ink has CIE LCH coordinates of L=48, C=61, and H=1; the yellow ink has CIE LCH coordinates of L=88, C=91, and H=93; the black ink has CIE LCH coordinates of L=27, C=1, and H=71; the XG Purple 1 ink has CIE LCH coordinates of L=41, C=53, and H=280; the XG Purple 2 ink has CIE LCH coordinates of L=33, C=59, and H=306; the XG Orange 1 ink has CIE LCH coordinates of L=67, C=78, and H=47; the XG Orange 2 ink has CIE LCH coordinates of L=56, C=71, and H=30; the XG Green 1 ink has CIE LCH coordinates of L=64, C=68, and H=147; the XG Green 2 ink has CIE LCH coordinates of L=63, C=65, and H=175; and the XG Quinacridone ink has CIE LCH coordinates of L=62, C=52, and H=338. Those skilled in the art will appreciate that there can be some variation in the ink colors without perceptibly changing the overall printing results. The color tolerance can be selected to be looser or tighter as desired for a particular application. In one embodiment, the CIE LCH color tolerance for each ink is an L tolerance of ±1.75, a C tolerance of ±2.00, and an H tolerance of ±0.75.

The inks are typically composed of pure pigment in a carrier. The inks in the eleven-color ink set are standardized, so each of the inks is always the same, and no other inks are required. Exemplary pigments, listed by pigment color index names, for each ink are as follows: cyan ink—Pigment Blue 15:4; magenta ink—Pigment Red 57; yellow ink—Pigment Yellow 14; XGP1 ink—62.50 percent Pigment Blue 15:4 and 37.50 percent Pigment Violet 23; XGP2 ink—Pigment Violet 23; XGO1 ink—Pigment Orange 16; XGO2 ink—Pigment Red 22; XGG1 ink—23.75 percent Pigment Yellow 14 and 76.25 percent Pigment Green 7; XGG2 ink—Pigment Green 7; XGQ ink—Pigment Red 122; and black ink—Pigment Black 7.

The inks of the eleven-color ink set can be printed in various combinations as desired for a particular application. In one embodiment, the CMYK colors are combined with complimentary colors from the XG colors, i.e., the XGP1, XGP2, XGO1, XGO2, XGG1, XGG2, and XGQ colors. For example, the XGO1 ink can be printed with the XGQ, M, Y, and/or K inks, and the XGO2 ink can be printed with the XGQ, M, Y, and/or K inks. The XGP1 ink can be printed with the XGQ, C, M, and/or K inks, and the XGP2 ink can be printed with the XGQ, C, M, and/or K inks. The XGG1 ink can be printed with the C, Y, and/or K inks, and the XGG2 ink can be printed with the C, Y, and/or K inks. The XGQ ink can be printed with the XGO1, XGO2 XGP1, XGP2, M, Y, and/or K inks. Those skilled in the art will appreciate that any ink combination can be used as desired for a particular application. The inks can be layered to produce the desired visual color perception.

FIG. 1 is an exemplary multicolor profile chart for a four-color ink set gamut and a nine of eleven-color ink set gamut for an eleven-color ink set of the present invention. Some of the points printed with the eleven-color ink set fall outside of the boundary of the four-color ink set gamut, illustrating that the eleven-color ink set provides a larger gamut.

The multicolor profile 100 includes color patches 102 illustrating particular colors printed with the eleven-color ink set and a four-color process boundary 104 depicting the limit of the colors available with the industry standard GRACoL four-color process (CMYK), i.e., the GRACoL four-color process color gamut. The a* CIELAB coordinates are plotted on the x-axis and the b* CIELAB coordinates are plotted on the y-axis. In this example, only nine inks of the eleven-color ink set were used to print the color patches 102: cyan, magenta, yellow, black, XGP1, XGP2, XGG1, XGO2, and XGQ. The color print was converted to the gray scale image of FIG. 1 to show the relative extent of the different ink sets. Some of the color patches 102 fall outside of the four-color process boundary 104, illustrating the increased eleven-color ink set color gamut over the four-color ink set color gamut even when only nine of the eleven inks of the eleven-color ink set are used. Those skilled in the art will appreciate that colors that can be printed with the eleven-color ink set are not limited to those illustrated by the color patches 102, but that colors between the color patches 102 can also be achieved.

The eleven-color ink set can be employed in a method of printing an image including providing an eleven-color ink set; providing a color separation based on the eleven-color ink set; and printing the image solely with the eleven-color ink set according to the color separation. The eleven-color ink set can be an eleven-color ink set as discussed above including cyan ink with CIELAB coordinates of $L^*=55$, $a^*=-28$, and $b^*=-43$; magenta ink with CIELAB coordinates of $L^*=48$, $a^*=61$, and $b^*=1$; yellow ink with CIELAB coordinates of $L^*=88$, $a^*=-5$, and $b^*=91$; black ink with CIELAB coordinates of $L^*=27$, $a^*=0.3$, $b^*=0.7$; XGP1 ink with CIELAB coordinates of $L^*=41$, $a^*=10$, and $b^*=-53$; XGP2 ink with CIELAB coordinates of $L^*=33$, $a^*=34$, and $b^*=-48$; XGO1 ink with CIELAB coordinates of $L^*=67$, $a^*=53$, and $b^*=57$; the XGO2 ink with CIELAB coordinates of $L^*=56$, $a^*=61$, and $b^*=35$; XGG1 ink with CIELAB coordinates of $L^*=64$, $a^*=-57$, and $b^*=37$; XGG2 ink with CIELAB coordinates of $L^*=63$, $a^*=-65$, and $b^*=6$; and XGQ ink with CIELAB coordinates of $L^*=62$, $a^*=49$, and $b^*=-19$. The printing process can be a lithographic, flexographic, or gravure printing process or the like, as desired for a particular application.

Figure 2:
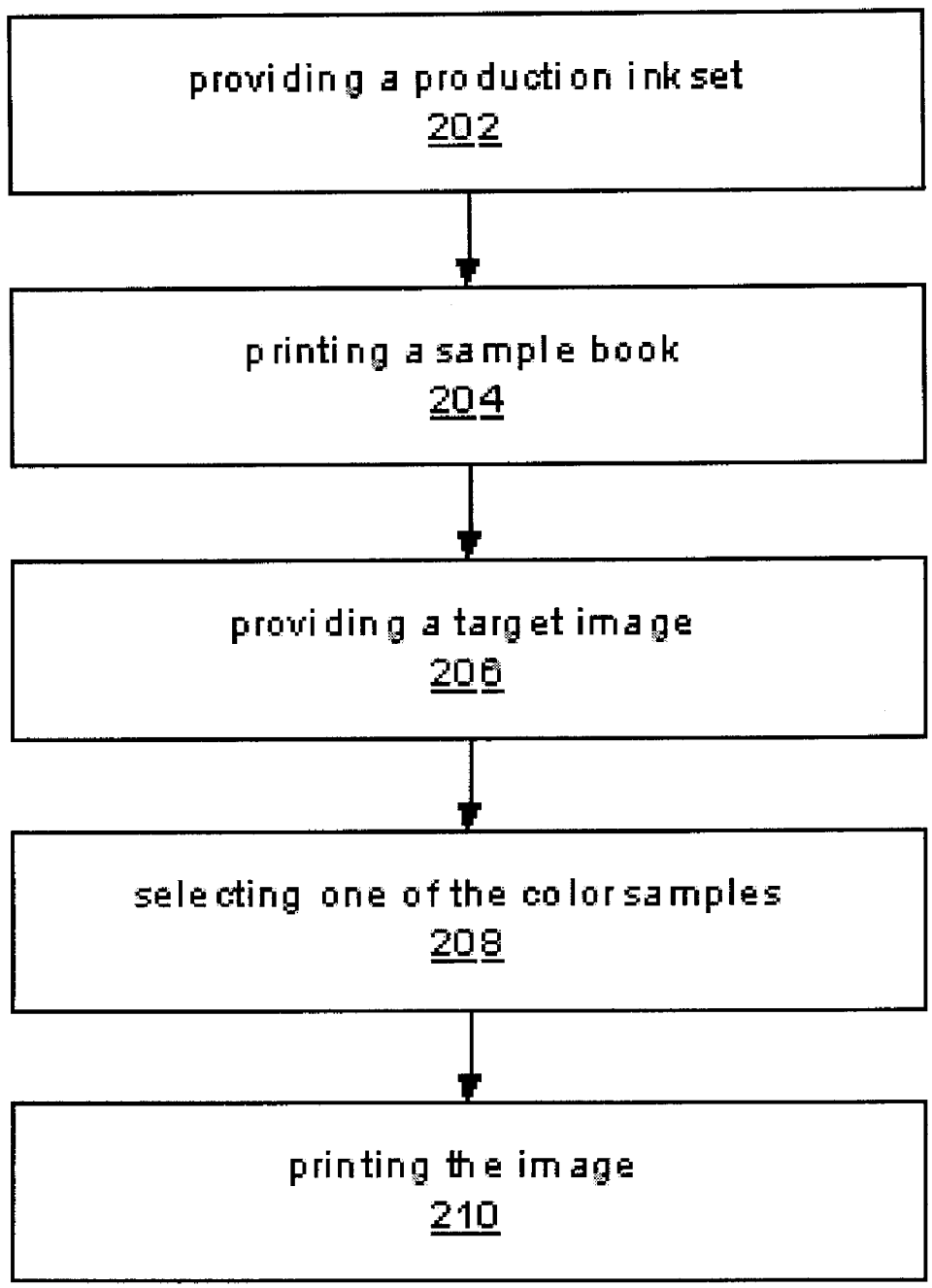
FIG. 2 is a flowchart of a method of printing an image with a production press in accordance with the present invention.

FIG. 2 is a flowchart of a method of printing an image with a production press in accordance with the present invention. The method uses the production press and ink set to print a sample book of sample colors. The image is printed with the same production press and ink set, so the colors in the image precisely match the sample colors selected from the sample book.

The method 200 includes providing a production ink set 202; printing a sample book 204 for the production ink set with the production press, the sample book including color samples indexed by substrate type, ink combination, and ink density; providing a target image 206 having at least one target image color on a target substrate; selecting one of the color samples 208 to match the at least one target image color, the substrate type for the selected one of the color samples being the same as the target substrate; printing the image 210 with the ink combination and ink density of the selected one of the color samples on a production substrate with the production press using the production ink set, the production substrate being substantially the same as the substrate type for the selected one of the color samples.

The providing a production ink set 202 can include providing an eleven-color ink set, such as an eleven-color ink set as discussed above including cyan ink with CIELAB coordinates of $L^*=55$, $a^*=-28$, and $b^*=-43$; magenta ink with CIELAB coordinates of $L^*=48$, $a^*=61$, and $b^*=1$; yellow ink with CIELAB coordinates of $L^*=88$, $a^*=-5$, and $b^*=91$; black ink with CIELAB coordinates of $L^*=27$, $a^*=0.3$, $b^*=0.7$; XGP1 ink with CIELAB coordinates of $L^*=41$, $a^*=10$, and $b^*=-53$; XGP2 ink with CIELAB coordinates of $L^*=33$, $a^*=34$, and $b^*=-48$; XGO1 ink with CIELAB coordinates of $L^*=67$, $a^*=53$, and $b^*=57$; the XGO2 ink with CIELAB coordinates of $L^*=56$, $a^*=61$, and $b^*=35$; XGG1 ink with CIELAB coordinates of $L^*=64$, $a^*=-57$, and $b^*=37$; XGG2 ink with CIELAB coordinates of $L^*=63$, $a^*=-65$, and $b^*=6$; and XGQ ink with CIELAB coordinates of $L^*=62$, $a^*=49$, and $b^*=-19$. Those skilled in the art will appreciate that other ink sets can be provided as desired for a particular application.

Figure 3:
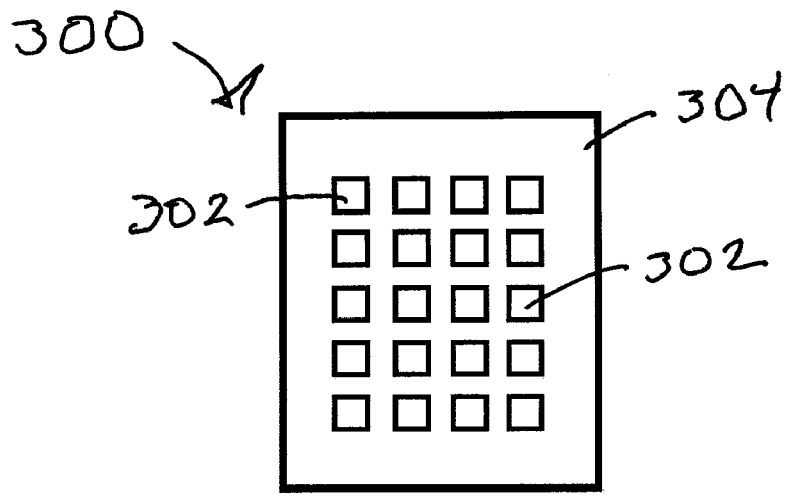
FIG. 3 is a schematic drawing of a sample book for use in a method of printing an image with a production press in accordance with the present invention.
Figure 3:
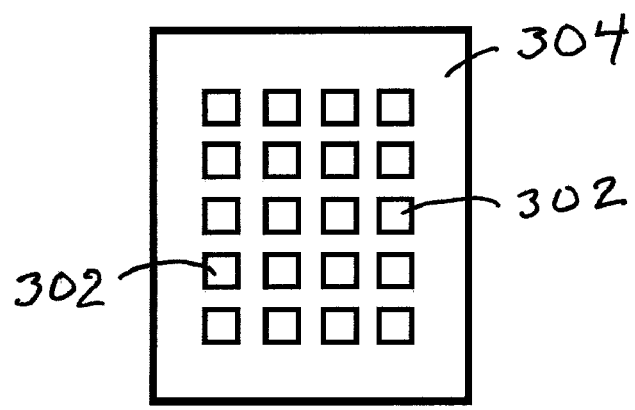
Figure 3:
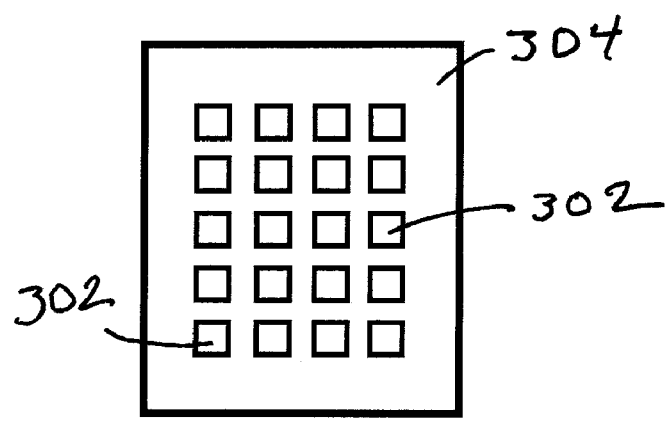

FIG. 3 is a schematic drawing of a sample book for use in a method of printing an image with a production press in accordance with the present invention, as produced by the printing a sample book 204 in FIG. 2. Referring to FIG. 3, the sample book 300 in this example includes color samples 302 printed on a number of pages 304. The pages 304 can be a number of different substrates, with multiple pages of each substrate as desired. The color samples 302 on a page 304 can be printed in a rectangular grid with the ink combination varying along one axis and the ink density varying along the other axis. Thus, each of the color samples 302 is indexed by substrate type, ink combination, and ink density, and is produced by the production press with the production ink set.

The color samples 302 can be color controlled using a spectrophotometer, such as an X-Rite spectrophotometer Model 939 available from X-Rite, Incorporated, of Grand Rapids, Mich., or the like, to a DECMC less than or equal to 1.5, with L equal to 1.75, C equal to 1, and CF equal to 1.75, and measured at a 95 percent value of density control blocks. The allowable absolute density values measured at 95 percent for each of the inks in the eleven-color ink set are 1.25±0.05 for C ink, 1.25±0.05 for M ink, 0.98±0.03 for Y ink, 1.35±0.05 for K ink, 1.20±0.05 for XGP1 ink, 1.25±0.05 for XGP2 ink, 1.10±0.05 for XGO1 ink, 1.10±0.05 for XGO2 ink, 0.95±0.05 for XGG1 ink, 1.25±0.05 for XGG2 ink, and 0.74±0.03 for XGQ ink. DECMC is the total color variance from the standard as determined by the CMC tolerencing system which uses a mathematical calculation creating an ellipsoid around the standard color with the semi-axis corresponding to hue, chroma, and lightness. L is the relative lightness, where a negative value is relative darkness and a positive value is relative lightness; C is the saturation, where positive values equal more vibrant and pure color and negative values equal weaker and less pure color; and cf is the commercial factor which equals total color)

Referring to FIG. 2, the target image provided 206 has at least one target image color on a target substrate. The target image is the desired image for the final product to be produced by the production press. For example, the target image could be a graphic design on a food wrapper as a target substrate or container made of a particular plastic as a target substrate. Those skilled in the art will appreciate that the look and color of the image of the final product is affected by the characteristics of the target substrate, such as reflectivity, finish, color, and the like. The target image can include a number of target image colors.

The selecting one of the color samples 208 to match the at least one target image color can include matching the at least one target image color by visual inspection, machine inspection, or automatic computer inspection. The substrate type for the selected one of the color samples is the same as the target substrate so that the color of the image of the final product will match the color of the color sample. In one embodiment, the selecting can optionally include printing a sample image with the ink combination and ink density of the selected one of the color samples on an off-line printer. The sample image may differ from the image produced on the production press, but can be used as an intermediate check to assure that the selecting of the color samples is reasonable. In another embodiment, the selecting can include translating the selected one of the color samples when the substrate type for the selected one of the color samples is not the same as the target substrate. When the sample book does not include the particular target substrate to be used in production, the color samples can be translated and/or cross referenced, so that the color samples which are in the sample book yield the desired image on the particular target substrate.

The printing the image 210 produces the image on the final product. The printing is performed with the ink combination and ink density of the selected color sample on a production substrate with the production press using the production ink set. The production substrate is substantially the same as the substrate type for the selected color sample. The printing process can be a lithographic, flexographic, or gravure printing process or the like, as desired for a particular application. The wet ink is controlled using a K-Proof Press, which is controlled using an X-Rite Model 939 spectrophotometer or the like to a DECMC value of less than or equal to 1, with L equal to 2, C equal to 1, and CF equal to 2.

It should be appreciated that, while an eleven-color ink set and a method of printing using an eleven-color ink set are provided above, different ink sets are contemplated. For example, in one embodiment a twelve-color ink set and method of printing using a twelve color ink set are contemplated, the twelve-color ink set including a cyan1 (C1) ink, a cyan2 (C2) ink, a magenta (M) ink, a yellow (Y) ink, a black (K) ink, an XG Purple 1 (XGP1) ink, an XG Purple 2 (XGP2) ink, an XG Orange 1 (XGO1) ink, an XG Orange 2 (XGO2) ink, an XG Green 1 (XGG1) ink, an XG Green 2 (XGG2) ink, and an XG Quinacridone (XGQ) ink. The cyan1, magenta, yellow and black inks provide a four-color CYMK ink set and the cyan 2, XGP1, XGP2, XGO1, XGO2, XGG1, XGG2, and XGQ XG inks extend the color gamut of the four-color CYMK ink set.

The inks can be further described by the CIELAB coordinates, where Cyan 1 ink has CIELAB coordinates of $L^*=55$, $a^*=-28$, and $b^*=-43$; Cyan 2 ink has CIELAB coordinates of $L^*=77$, $a^*=-29$, and $b^*=-21.5$, the magenta ink has CIELAB coordinates of $L^*=48$, $a^*=61$, and $b^*=1$; the yellow ink has CIELAB coordinates of $L^*=88$, $a^*=-5$, and $b^*=91$; the XGP1 ink has CIELAB coordinates of $L^*=38$, $a^*=11$, and $b^*=-55$; the XGP2 ink has CIELAB coordinates of $L^*=33$, $a^*=34$, and $b^*=-48$; the XGO1 ink has CIELAB coordinates of $L^*=67$, $a^*=53$, and $b^*=57$; the XGO2 ink has CIELAB coordinates of $L^*=56$, $a^*=61$, and $b^*=35$; the XGG1 ink has CIELAB coordinates of $L^*=64$, $a^*=-57$, and $b^*=37$; the XGG2 ink has CIELAB coordinates of $L^*=63$, $a^*=-65$, and $b^*=6$; and the XGQ ink has CIELAB coordinates of $L^*=62$, $a^*=49$, and $b^*=-19$. The black ink has a CIELAB coordinate of $L^*=27$, $a^*=0.3$, $b^*=0.7$. Those skilled in the art will appreciate that there can be some variation in the ink colors without perceptibly changing the overall printing results. The color tolerance can be selected to be looser or tighter as desired for a particular application. In one embodiment, the CMC color tolerance for each ink is an L tolerance of ±1.75, a C tolerance of ±1.50, a cf tolerance of ±1.5, and a DECMC of ±1.50.

Again, the inks can be more narrowly described in another embodiment by the CIE LCH coordinates of L, C, and H, where L is the color lightness, C is chroma, and H is hue. In the twelve-color ink set the cyan1 ink has CIE LCH coordinates of L=55, C=51, and H=237; the cyan 2 ink has CIE LCH coordinates of L=76, C=36, and H=217; the magenta ink has CIE LCH coordinates of L=48, C=61, and H=1; the yellow ink has CIE LCH coordinates of L=88, C=91, and H=93; the black ink has CIE LCH coordinates of L=27, C=1, and H=71; the XG Purple 1 ink has CIE LCH coordinates of L=41, C=53, and H=280; the XG Purple 2 ink has CIE LCH coordinates of L=33, C=59, and H=306; the XG Orange 1 ink has CIE LCH coordinates of L=67, C=78, and H=47; the XG Orange 2 ink has CIE LCH coordinates of L=56, C=71, and H=30; the XG Green 1 ink has CIE LCH coordinates of L=64, C=68, and H=147; the XG Green 2 ink has CIE LCH coordinates of L=63, C=65, and H=175; and the XG Quinacridone ink has CIE LCH coordinates of L=62, C=52, and H=338. Those skilled in the art will appreciate that there can be some variation in the ink colors without perceptibly changing the overall printing results. The color tolerance can be selected to be looser or tighter as desired for a particular application. In one embodiment, the CIE LCH color tolerance for each ink is an L tolerance of ±1.75, a C tolerance of ±2.00, and an H tolerance of ±0.75.

The inks are typically composed of pure pigment in a carrier. The inks in the twelve-color ink set are standardized, so each of the inks is always the same, and no other inks are required. Exemplary pigments, listed by pigment color index names, for each ink are as follows: cyan 1 ink—Pigment Blue 15:4; cyan 2 ink—Pigment Blue 15:4 but with more extender in comparison to the cyan 1 ink; magenta ink—Pigment Red 57; yellow ink—Pigment Yellow 14; XGP1 ink—62.50 percent Pigment Blue 15:4 and 37.50 percent Pigment Violet 23; XGP2 ink—Pigment Violet 23; XGO1 ink—Pigment Orange 16; XGO2 ink—Pigment Red 22; XGG1 ink—23.75 percent Pigment Yellow 14 and 76.25 percent Pigment Green 7; XGG2 ink—Pigment Green 7; XGQ ink—Pigment Red 122; and black ink—Pigment Black 7.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

We claim:

1. An eleven-color ink set comprising:
   a cyan ink with CIELAB coordinates of $L^*=55$, $a^*=-28$, and $b^*=-43$;
   a magenta ink with CIELAB coordinates of $L^*=48$, $a^*=61$, and $b^*=1$;
   a yellow ink with CIELAB coordinates of $L^*=88$, $a^*=-5$, and $b^*=91$;
   a black ink with CIELAB coordinates of $L^*=27$, $a^*=0.3$, $b^*=0.7$;
   an XG Purple 1 ink with CIELAB coordinates of $L^*=41$, $a^*=10$, and $b^*=-53$;
   an XG Purple 2 ink with CIELAB coordinates of $L^*=33$, $a^*=34$, and $b^*=-48$;
   an XG Orange 1 ink with CIELAB coordinates of $L^*=67$, $a^*=53$, and $b^*=57$;
   an XG Orange 2 ink with CIELAB coordinates of $L^*=56$, $a^*=61$, and $b^*=35$;
   an XG Green 1 ink with CIELAB coordinates of $L^*=64$, $a^*=-57$, and $b^*=37$;
   an XG Green 2 ink with CIELAB coordinates of $L^*=63$, $a^*=-65$, and $b^*=6$; and
   an XG Quinacridone ink with CIELAB coordinates of $L^*=62$, $a^*=49$, and $b^*=-19$;
   wherein CMC color tolerance for each ink is an L tolerance of ±1.75, a C tolerance of ±1.50, a cf tolerance of ±1.5, and a DECMC of ±1.50.

2. The ink set of claim 1 wherein:
   the cyan ink has CIE LCH coordinates of L=55, C=51, and H=237;

the magenta ink has CIE LCH coordinates of L=48, C=61, and H=1;
the yellow ink has CIE LCH coordinates of L=88, C=91, and H=93;
the black ink has CIE LCH coordinates of L=27, C=1, and H=71;
the XG Purple 1 ink has CIE LCH coordinates of L=41, C=53, and H=280;
the XG Purple 2 ink has CIE LCH coordinates of L=33, C=59, and H=306;
the XG Orange 1 ink has CIE LCH coordinates of L=67, C=78, and H=47;
the XG Orange 2 ink has CIE LCH coordinates of L=56, C=71, and H=30;
the XG Green 1 ink has CIE LCH coordinates of L=64, C=68, and H=147;
the XG Green 2 ink has CIE LCH coordinates of L=63, C=65, and H=175;
the XG Quinacridone ink has CIE LCH coordinates of L=62, C=52, and H=338; and
CIE LCH color tolerance for each ink is an L tolerance of ±1.75, a C tolerance of ±2.00, and an H tolerance of ±0.75.

3. The ink set of claim 1 wherein:
the cyan ink comprises Pigment Blue 15:4;
the magenta ink comprises Pigment Red 57;
the yellow ink comprises Pigment Yellow 14;
the black ink comprises Pigment Black 7;
the XG Purple 1 ink comprises 62.50 percent Pigment Blue 15:4 and 37.50 percent Pigment Violet 23;
the XG Purple 2 ink comprises Pigment Violet 23;
the XG Orange 1 ink comprises Pigment Orange 16;
the XG Orange 2 ink comprises Pigment Red 22;
the XG Green 1 ink comprises 23.75 percent Pigment Yellow 14 and 76.25 percent Pigment Green 7;
the XG Green 2 ink comprises Pigment Green 7; and
the XG Quinacridone ink comprises Pigment Red 122.

4. A method of printing an image comprising:
providing an eleven-color ink set;
providing a color separation based on the eleven-color ink set; and
printing the image solely with the eleven-color ink set according to the color separation;
wherein the eleven-color ink set comprises:
a cyan ink with CIELAB coordinates of L*=55, a*=−28, and b*=−43;
a magenta ink with CIELAB coordinates of L*=48, a*=61, and b*=1;
a yellow ink with CIELAB coordinates of L*=88, a*=−5, and b*=91;
a black ink with CIELAB coordinates of L*=27, a*=0.3, b*=0.7;
an XG Purple 1 ink with CIELAB coordinates of L*=41, a*=10, and b*=−53;
an XG Purple 2 ink with CIELAB coordinates of L*=33, a*=34, and b*=−48;
an XG Orange 1 ink with CIELAB coordinates of L*=67, a*=53, and b*=57;
an XG Orange 2 ink with CIELAB coordinates of L*=56, a*=61, and b*=35;
an XG Green 1 ink with CIELAB coordinates of L*=64, a*=−57, and b*=37;
an XG Green 2 ink with CIELAB coordinates of L*=63, a*=−65, and b*=6; and
an XG Quinacridone ink with CIELAB coordinates of L*=62, a*=49, and b*=−19;
wherein CMC color tolerance for each ink is an L tolerance of ±1.75, a C tolerance of ±1.50, a cf tolerance of ±1.5, and a DECMC of ±1.50.

5. The method of claim 4 wherein:
the cyan ink has CIE LCH coordinates of L=55, C=51, and H=237;
the magenta ink has CIE LCH coordinates of L=48, C=61, and H=1;
the yellow ink has CIE LCH coordinates of L=88, C=91, and H=93;
the black ink has CIE LCH coordinates of L=27, C=1, and H=71;
the XG Purple 1 ink has CIE LCH coordinates of L=41, C=53, and H=280;
the XG Purple 2 ink has CIE LCH coordinates of L=33, C=59, and H=306;
the XG Orange 1 ink has CIE LCH coordinates of L=67, C=78, and H=47;
the XG Orange 2 ink has CIE LCH coordinates of L=56, C=71, and H=30;
the XG Green 1 ink has CIE LCH coordinates of L=64, C=68, and H=147;
the XG Green 2 ink has CIE LCH coordinates of L=63, C=65, and H=175; and
the XG Quinacridone ink has CIE LCH coordinates of L=62, C=52, and H=338; and
CIE LCH color tolerance for each ink is an L tolerance of ±1.75, a C tolerance of ±2.00, and an H tolerance of ±0.75.

6. The method of claim 4 wherein:
the cyan ink comprises Pigment Blue 15:4;
the magenta ink comprises Pigment Red 57;
the yellow ink comprises Pigment Yellow 14;
the black ink comprises Pigment Black 7;
the XG Purple 1 ink comprises 62.50 percent Pigment Blue 15:4 and 37.50 percent Pigment Violet 23;
the XG Purple 2 ink comprises Pigment Violet 23;
the XG Orange 1 ink comprises Pigment Orange 16;
the XG Orange 2 ink comprises Pigment Red 22;
the XG Green 1 ink comprises 23.75 percent Pigment Yellow 14 and 76.25 percent Pigment Green 7;
the XG Green 2 ink comprises Pigment Green 7; and
the XG Quinacridone ink comprises Pigment Red 122.

7. The method of claim 4 wherein the printing comprises printing the image with a flexographic process.

8. The method of claim 4 wherein the printing comprises printing the image with a process selected from the group consisting of lithographic and gravure printing processes.

9. A method of printing an image with a production press comprising:
providing a production ink set, comprising
a cyan ink with CIELAB coordinates of L*=55, a*=−28, and b*=−43;
a magenta ink with CIELAB coordinates of L*=48, a*=61, and b*=1;
a yellow ink with CIELAB coordinates of L*=88, a*=−5, and b*=91;
a black ink with CIELAB coordinates of L*=27, a*=0.3, b*=0.7;
an XG Purple 1 ink with CIELAB coordinates of L*=41, a*=10, and b*=−53;
an XG Purple 2 ink with CIELAB coordinates of; L*=33, a*=34, and b*=−48;
an XG Orange 1 ink with CIELAB coordinates of; L*=67, a*=53, and b*=57;
an XG Orange 2 ink with CIELAB coordinates of; L*=56, a*=61, and b*=35;

an XG Green 1 ink with CIELAB coordinates of; L*=64, a*=−57, and b*=37;

an XG Green 2 ink with CIELAB coordinates of; L*=63, a*=−65, and b*=6; and an XG Quinacridone ink with CIELAB coordinates of; L*=62, a*=49, and b*=−19;

wherein CMC color tolerance for each ink is an L tolerance of ±1.75, a C tolerance of ±1.50, a cf tolerance of ±1.5, and a DECMC of ±1.50;

printing a sample book for the production ink set with the production press, the sample book including color samples indexed by substrate type, ink combination, and ink density;

providing a target image having at least one target image color on a target substrate;

selecting one of the color samples to match the at least one target image color, the substrate type for the selected one of the color samples being the same as the target substrate;

printing the image with the ink combination and ink density of the selected one of the color samples on a production substrate with the production press using the production ink set, the production substrate being the same as the substrate type for the selected one of the color samples.

10. The method of claim 9 wherein:

the cyan ink has CIE LCH coordinates of L=55, C=51, and H=237;

the magenta ink has CIE LCH coordinates of L=48, C=61, and H=1;

the yellow ink has CIE LCH coordinates of L=88, C=91, and H=93;

the black ink has CIE LCH coordinates of L=27, C=1, and H=71;

the XG Purple 1 ink has CIE LCH coordinates of L=41, C=53, and H=280;

the XG Purple 2 ink has CIE LCH coordinates of L=33, C=59, and H=306;

the XG Orange 1 ink has CIE LCH coordinates of L=67, C=78, and H=47;

the XG Orange 2 ink has CIE LCH coordinates of L=56, C=71, and H=30;

the XG Green 1 ink has CIE LCH coordinates of L=64, C=68, and H=147;

the XG Green 2 ink has CIE LCH coordinates of L=63, C=65, and H=175;

the XG Quinacridone ink has CIE LCH coordinates of L=62, C=52, and H=338; and

CIE LCH color tolerance for each ink is an L tolerance of ±1.75, a C tolerance of ±2.00, and an H tolerance of ±0.75.

11. The method of claim 9 wherein:

the cyan ink comprises Pigment Blue 15:4;

the magenta ink comprises Pigment Red 57;

the yellow ink comprises Pigment Yellow 14;

the black ink comprises Pigment Black 7;

the XG Purple 1 ink comprises 62.50 percent Pigment Blue 15:4 and 37.50 percent Pigment Violet 23;

the XG Purple 2 ink comprises Pigment Violet 23;

the XG Orange 1 ink comprises Pigment Orange 16;

the XG Orange 2 ink comprises Pigment Red 22;

the XG Green 1 ink comprises 23.75 percent Pigment Yellow 14 and 76.25 percent Pigment Green 7;

the XG Green 2 ink comprises Pigment Green 7; and the XG Quinacridone ink comprises Pigment Red 122.

12. The method of claim 9 wherein the production press is a flexographic process press.

13. The method of claim 9 wherein the production press is selected from the group consisting of lithographic and gravure printing process presses.

14. The method of claim 9 wherein the selecting one of the color samples further comprises selecting one of the color samples by visual inspection.

15. The method of claim 9 wherein the selecting one of the color samples further comprises selecting one of the color samples by an inspection method selected from the group consisting of machine inspection and automatic computer inspection.

16. The method of claim 9 wherein the selecting one of the color samples further comprises printing a sample image with the ink combination and ink density of the selected one of the color samples on an off-line printer.

17. The method of claim 9 wherein the selecting one of the color samples further comprises translating the selected one of the color samples when the substrate type for the selected one of the color samples is not the same as the target substrate.

* * * * *